United States Patent
Kano

(10) Patent No.: US 10,021,292 B2
(45) Date of Patent: Jul. 10, 2018

(54) IMAGE PROCESSING APPARATUS, IMAGE CAPTURING APPARATUS AND IMAGE PROCESSING PROGRAM

(71) Applicant: CANON KABUSHIKI KAISHA, Tokyo (JP)

(72) Inventor: Masaaki Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 15/373,579

(22) Filed: Dec. 9, 2016

(65) Prior Publication Data

US 2017/0171463 A1    Jun. 15, 2017

(30) Foreign Application Priority Data

Dec. 10, 2015 (JP) .................. 2015-241056

(51) Int. Cl.
- H04N 5/232 (2006.01)
- G06K 9/00 (2006.01)

(52) U.S. Cl.
CPC ..... *H04N 5/23219* (2013.01); *G06K 9/00248* (2013.01); *G06K 9/00255* (2013.01); *G06K 9/00604* (2013.01); *H04N 5/23212* (2013.01)

(58) Field of Classification Search
None
See application file for complete search history.

(56) References Cited

U.S. PATENT DOCUMENTS 9,210,318 B2 * 12/2015 Kunishige .......... H04N 5/23212

FOREIGN PATENT DOCUMENTS

JP    2014-137567 A    7/2014

* cited by examiner

*Primary Examiner* — Mark T Monk
(74) *Attorney, Agent, or Firm* — Cowan, Liebowitz & Latman P.C.

(57) ABSTRACT

The image processing apparatus includes an image producer to produce a captured image by using outputs from multiple photoelectric converters in an image sensor, a phase difference information acquirer to acquire phase difference information by using outputs from multiple specific photoelectric converters, and an object detector to detect an object, a size detector to detect an image size of the detected object. The object detector is capable of detecting a first object and a second object that is a part of the first object. The selector selects, when the image size of the first object is smaller than a predetermined size, the specific photoelectric converters depending on an area including the first object and selects, when the image size of the first object is larger than the predetermined size, the specific photoelectric converters depending on an area including the second object.

12 Claims, 7 Drawing Sheets

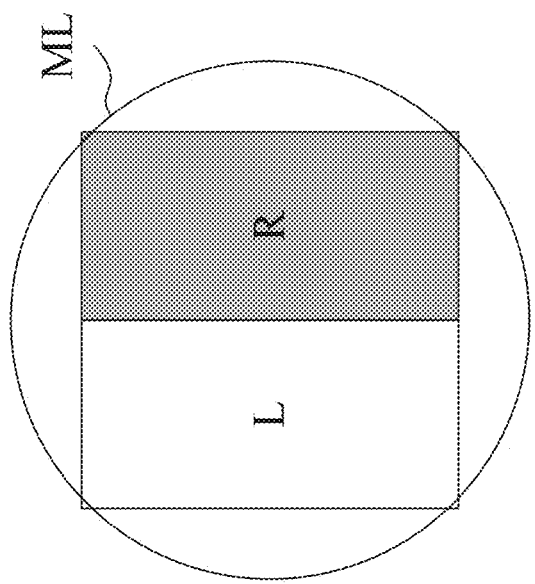

IMAGE PROCESSING APPARATUS, IMAGE CAPTURING APPARATUS AND IMAGE PROCESSING PROGRAM

BACKGROUND OF THE INVENTION

Field of the Invention

The present invention relates to a technique to acquire, in an image capturing apparatus provided with an image sensor capable of acquiring a captured image and phase difference information, the phase difference information for an object detected from the captured image.

Description of the Related Art

An image capturing apparatus is disclosed in Japanese Patent Laid-Open No. 2014-137567. The disclosed image capturing apparatus is provided with an image sensor including multiple image capturing pixels from which outputs for producing a captured image can be read out and multiple phase difference detection pixels from which outputs to be used for a focusing operation can be read out. Such an image capturing apparatus is desirable, in order to increase a focusing operation speed and improve an in-focus accuracy, that allows outputs from the image capturing pixels and the phase difference detection pixels to be simultaneously read out.

However, enabling such simultaneous readout of the outputs from the image capturing pixels and the phase difference detection pixels for a purpose of increasing resolution and frame rate significantly increases a number of terminals for reading out signals, which results in increase in size of the image sensor including the terminals. Furthermore, an increase in number of the phase difference detection pixels from which their outputs are read out causes a problem of increasing electric power consumption.

For such problems, as disclosed in Japanese Patent Laid-Open No. 2014-137567, a configuration may be employed that detects a specific object such as a face from the outputs from the image capturing pixels and read out the outputs from the phase difference detection pixels included in an area including the specific object in the captured image.

However, a large proportion of the specific object occupying in the captured image increases an area where the outputs of the phase difference detection pixels should be read out in the image sensor, and thereby the number of the phase difference detection pixels exceeds a maximum readable pixel number (pixel line numbers) in the image sensor. As a result, all the outputs of the phase difference detection pixels whose outputs should be read out cannot be read out, which makes it impossible to acquire required phase difference information.

SUMMARY OF THE INVENTION

The present invention provides an image processing apparatus capable of acquiring, even when an object is large in a captured image, required phase difference information. The present invention also provides an image capturing apparatus including the image processing apparatus and others.

The present invention provides as an aspect thereof an image processing apparatus used in an image capturing apparatus provided with an image sensor including multiple photoelectric converters. The image processing apparatus includes an image producer configured to produce a captured image by using outputs from the multiple photoelectric converters, a phase difference information acquirer configured to acquire phase difference information by using outputs from multiple specific photoelectric converters that are a part of the multiple photoelectric converters, an object detector configured to detect an object included in the captured image, a size detector configured to detect an image size of the detected object, and a selector configured to select the specific photoelectric converters. The object detector is capable of detecting, as the object, a first object and a second object that is a part of the first object. The selector is configured to select, when the image size of the first object is smaller than a predetermined size, the specific photoelectric converters depending on a first area including the first object in the captured image. The selector is configured to select, when the image size of the first object is larger than the predetermined size, the specific photoelectric converters depending on a second area including the second object in the captured image.

The present invention provides as another aspect thereof an image processing apparatus used in an image capturing apparatus provided with an image sensor including multiple photoelectric converters. The image processing apparatus includes an image producer configured to produce a captured image by using outputs from the multiple photoelectric converters, a phase difference information acquirer configured to acquire phase difference information by using outputs from multiple specific photoelectric converters that are a part of the multiple photoelectric converters, an object detector configured to detect an object included in the captured image, a size detector configured to detect an image size of the detected object, and a selector configured to select the specific photoelectric converters. The selector is configured to select, when the image size of the object is smaller than a predetermined size, the specific photoelectric converters depending on an area including the object in the captured image. The selector is configured to divide, when the image size of the object is larger than the predetermined size, the multiple specific photoelectric converters into multiple specific photoelectric converter groups and select a mutually different one of the specific photoelectric converter groups in each of multiple image capturing operations.

The present invention provides as yet another aspect thereof an image capturing apparatus including an image sensor including multiple photoelectric converters, and any one of the above image processing apparatuses.

The present invention provides as still another aspect thereof a non-transitory computer-readable storage medium for storing a computer program to cause a computer in an image capturing apparatus provided with an image sensor including multiple photoelectric converters to execute image processing performed by the image processing apparatus.

Further features and aspects of the present invention will become apparent from the following description of exemplary embodiments with reference to the attached drawings.

BRIEF DESCRIPTION OF THE DRAWINGS

FIGS. 2A and 2B illustrate a structure of one pixel of an image sensor included in the image capturing apparatus of Embodiment 1.

DESCRIPTION OF THE EMBODIMENTS

Exemplary embodiments of the present invention will hereinafter be described with reference to the accompanying drawings.

Embodiment 1

Figure 1:
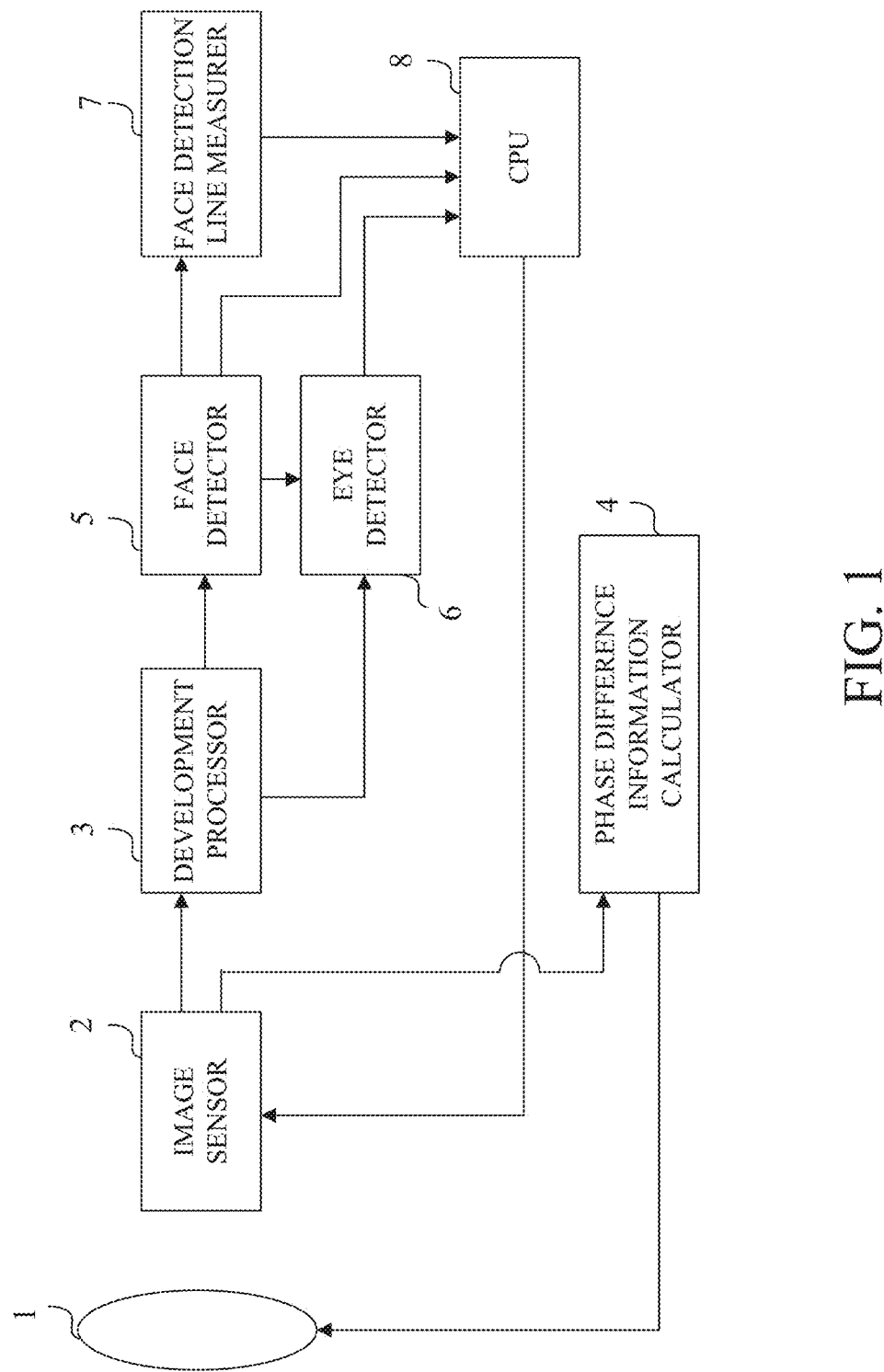
FIG. 1 is a block diagram illustrating a configuration of an image capturing apparatus that is Embodiment 1 of the present invention.

FIG. 1 illustrates a configuration of an image capturing apparatus that is a first embodiment (Embodiment 1) such as a digital camera or a video camera. An image capturing lens (image capturing optical system) 1 causes light from an object (not illustrated) to form an object image. An image sensor 2 is constituted by a CMOS sensor or the like and photoelectrically converts the object image formed by the image capturing lens 1 into electrical signals (output signals).

As illustrated in FIG. 2A, one pixel of the image sensor 2 includes one microlens ML and multiple photoelectric converters, i.e., a first photoelectric converter L and a second photoelectric converter R. Multiple pixels (for example, 4096×2160 pixels) each having such a configuration are two-dimensionally arranged, as illustrated in FIG. 2B.

The image sensor 2 is provided with a readout circuit (not illustrated).

The readout circuit is capable of performing an addition readout that reads out an additive output signal obtained by adding the output signals from the first and second photoelectric converters L and R to each other and an individual readout that individually reads out the output signal from the first photoelectric converter L. The additive output signal (hereinafter referred to as "an L+R signal") is converted into a digital signal by an A/D converter included in the readout circuit, and the digital signal is supplied to a development processor 3 and a phase difference information calculator 4. On the other hand, the individually readout output signal (hereinafter referred to as "an L signal") as a first output is converted into a digital signal by the A/D converter, and the digital signal is supplied to the phase difference information calculator 4.

The development processor 3 as an image producer performs development processes such as a pixel interpolation process and a color correction process on the L+R signal (RAW data) to produce a captured image. The captured image is output to a face detector 5 and an eye detector 6.

The phase difference information calculator 4 as a phase difference information acquirer produces, by subtracting the input L signal (also referred to as "an L image") from the input L+R signal (also referred to as "an L+R image") to produce an R signal (also referred to as "an R image") as a difference output.

Then, the phase difference information calculator 4 performs a correlation calculation on the L and R images to calculate phase difference information indicating a phase difference as an image shift amount between the L and R images. The phase difference information is used for calculating a defocus amount of the image capturing lens 1. Performing a position control on a focus lens in the image capturing lens 1 using the defocus amount enables achieving an in-focus state where the image capturing lens 1 is focused on the object. The phase difference information can provide information on a distance to the object.

Although this embodiment describes the case where the output signal from the first photoelectric converter L of the image sensor 2 is individually read out, a configuration may be employed that the output signal from the second photoelectric converter R is individually read out. In this case, the phase difference information calculator 4 produces, by subtracting the R image from the L+R image to produce the L image (difference output).

The face detector 5 is capable of detecting a face (first object) in the captured image input from the development processor 3. When detecting the face, the face detector 5 outputs information on an image area including the face (the image area is hereinafter referred to as "a face area") to a face detection line measurer 7 and the eye detector 6. The face detector 5 further outputs, to a CPU 8, information indicating an upper end position and a lower end position (positions in a vertical direction) of the face area in the captured image. This information is hereinafter referred to as "vertical face position information".

The face detection line measurer 7 as a size detector measures (detects), from the input information on the face area, a number Lf of pixel lines included in that face area in the vertical direction. The number Lf of the pixel lines indicates an image size of the face and is hereinafter referred to as "a face line number Lf". The face detection line measurer 7 outputs information on the measured face line number Lf to the CPU 8.

The eye detector 6 is capable of detecting, by using the captured image input from the development processor 3 and the information on the face area input from the face detector 5, an eye (or eyes) as a second object that is a part of the face in the captured image.

Then, the eye detector 6 outputs, to the CPU 8, information indicating an upper end position and a lower end position (positions in the vertical direction) of an image area included in the eye (eyes) in the captured image. This information is hereinafter referred to as "vertical eye position information", and the image area included in the eye is hereinafter referred to as "an eye area". A number of pixel lines included in the eye area in the vertical direction is smaller than the face line number Lf. The face detector 5 and the eye detector 6 constitute an object detector.

The CPU 8 receives, as described above, the vertical face position information input from the face detector 5, the vertical eye position information from the eye detector 6 and the information on the face line number Lf input from the face detection line measurer 7.

The CPU 8 as a selector compares the face line number Lf with a predetermined reference line number (predetermined size) Lc. The reference line number Lc is a pixel line number set depending on a maximum readable pixel line number as a number of pixel lines that can be simultaneously read out in the image sensor 2. The reference line number Lc may be equal to the maximum readable pixel line number or may be smaller than the maximum readable pixel line number by one or more pixel lines.

When the face line number Lf is smaller than the reference line number Lc (Lf<Lc), the CPU 8 selects (sets) multiple pixels included in a vertical pixel area in the image sensor 2; the vertical pixel area corresponds to a vertical image area from the upper end position to the lower end position of the face area indicated by the face position information. The L signals from the selected multiple pixels are individually read out. That is, the CPU 8 selects, as a part of the multiple first photoelectric converters L in the image sensor 2, specific photoelectric converters whose output signals are individually read out. In the following description, the vertical pixel area including the specific photoelectric converters from which the L signals are individually read out is hereinafter referred to as "a phase difference acquisition pixel area", and the phase difference acquisition pixel area corresponding to the face area is hereinafter referred to as "a face phase difference acquisition pixel area".

On the other hand, when the face line number Lf is larger than the reference line number Lc (Lf>Lc), the CPU 8 selects (sets) multiple pixels included in an eye phase difference acquisition pixel area that is another phase difference acquisition pixel area in the image sensor 2; the eye phase difference acquisition pixel area corresponds to a vertical image area from the upper end position to the lower end position of the eye area indicated by the vertical eye position information. That is, the CPU 8 selects, as a part of the multiple first photoelectric converters L in the image sensor 2, multiple specific photoelectric converters whose output signals are individually read out. A number of pixel lines including these multiple specific photoelectric converters selected by the CPU 8 is smaller than Lc.

The development processor 3, the phase difference information calculator 4, the face detector 5, the eye detector 6, the face detection line measurer 7 and the CPU 8 constitute an image processing apparatus.

Description will be made of the face phase difference acquisition pixel area when Lf<Lc and the eye phase difference acquisition pixel area when Lf>Lc with referring to FIGS. 3A to 3C and 4.

These drawings illustrate a captured image of 4K×2K (4096×2160) pixel lines, a face area (face detection area) F and an eye area E. These drawings further illustrate, in the captured image, the face phase difference acquisition pixel area A and the eye phase difference acquisition pixel area A' on the image sensor 2 as gray areas. In this description, the reference line number Lc is set to 300.

Figure 3A:
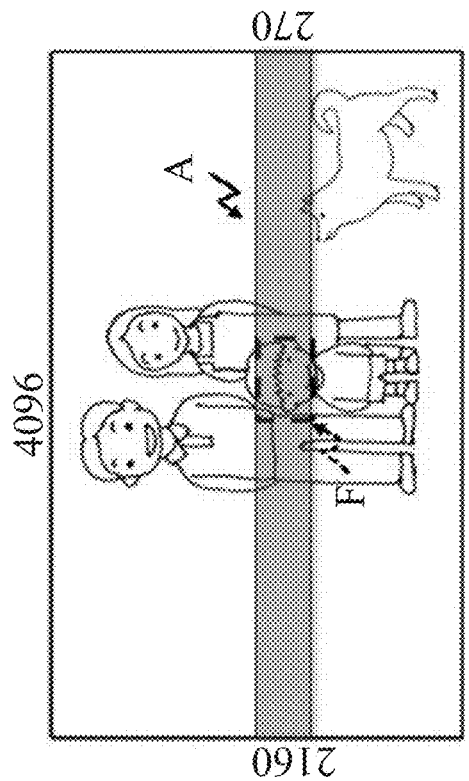
FIGS. 3A to 3C illustrate a phase difference information acquisition area depending on a size of a face area in the image capturing apparatus of Embodiment 1.

In FIG. 3A, the face line number Lf is 216. Therefore, Lf<Lc.

In this case, the specific photoelectric converters in the face phase difference acquisition pixel area A corresponding to the face area F (i.e., including 216 pixel lines or close thereto) are selected in the image sensor 2.

Figure 3B:
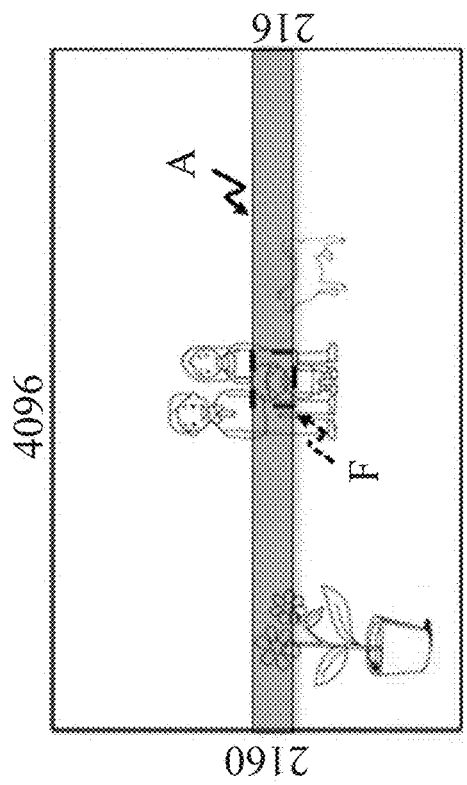

In FIG. 3B, the face line number Lf is 270. Therefore, Lf<Lc. Also in this case, the specific photoelectric converters in the face phase difference acquisition pixel area A corresponding to the face area F (i.e., including 270 pixel lines or close thereto) are selected in the image sensor 2.

Figure 3C:
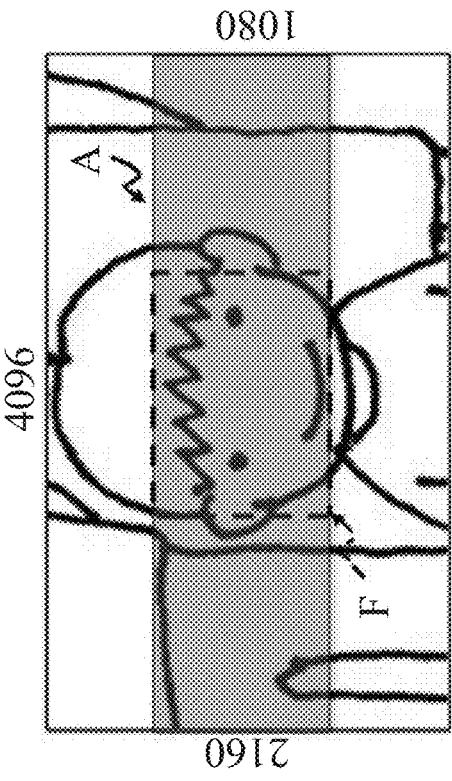

In FIG. 3C, the face line number Lf is 1080. Therefore, Lf>Lc.

Figure 4:
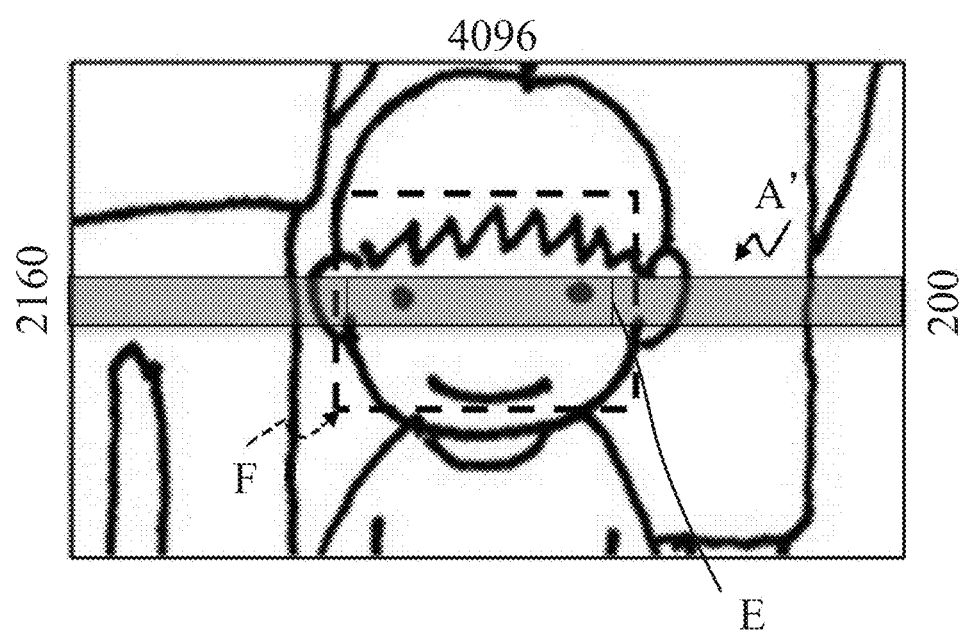
FIG. 4 illustrates another phase difference information acquisition area depending on a size of an eye area in Embodiment 1.

In this case, the face phase difference acquisition pixel area A corresponding to the face area F as illustrated in FIG. 3C is not selected in the image sensor 2, but the eye phase difference acquisition pixel area A' illustrated in FIG. 4 is selected. That is, the eye phase difference acquisition pixel area A' corresponding to the eye area E including 200 pixel lines (i.e., including 200 pixel lines or close thereto) is selected.

Next, description will be made of image processing performed by the CPU 8 with referring to FIG. 5. The CPU 8 as a computer executes this image processing according to an image processing program as a computer program.

At step 1000, the CPU 8 causes the image sensor 2 to start a photoelectric conversion operation (image capturing operation).

Next, at step 1001, the CPU 8 controls the development processor 3 to cause it to produce a captured image from the L+R signals output from the image sensor 2 and causes the face detector 5 to detect a face (i.e., to perform an object detection process).

Next, at step 1002, the CPU 8 causes the eye detector 6 to detect an eye (i.e., to perform another object detection process).

Next, at step 1003, the CPU 8 determines whether or not the face is detected in the captured image by the face detection at step 1001.

If the face is not detected, the CPU 8 sets a phase difference acquisition pixel area (reference phase difference acquisition pixel area) that is a preset initial value. Then, at step 1010, the CPU 8 selects in the image sensor 2 the phase difference acquisition pixel area set at step 1003. On the other hand, if the face is detected, the CPU 8 proceeds to step 1005.

At step 1005, the CPU 8 causes the face detection line measurer 7 to measure the face line number Lf (i.e., to perform a size detection process). Then, at S1006, the CPU 8 compares the face line number Lf acquired from the face detection line measurer 7 with the reference line number Lc. At step 1007, if the face line number Lf is smaller than the reference line number Lc, the CPU 8 proceeds to step 1008. If the face line number Lf is larger than (or equal to) the reference line number Lc, the CPU 8 proceeds to step 1009.

At step 1008, the CPU 8 sets the face phase difference acquisition pixel area corresponding to the vertical image area from the upper end position to the lower end position of the face area indicated by the vertical face position information from the face detector 5.

On the other hand, at step 1009, the CPU 8 sets the eye phase difference acquisition pixel area corresponding to the vertical image area from the upper end position to the lower end position of the eye area indicated by the vertical eye position information from the eye detector 6.

Then, at step 1010, the CPU 8 selects in the image sensor 2 one of the face phase difference acquisition pixel area set at step 1008 and the eye phase difference acquisition pixel area set at step 1009. The processes performed at steps 1008 to 1010 correspond to a selection process. Thereafter, the CPU 8 returns to step 1001.

As described above, this embodiment selects, when the face line number that is the image size of the face included in the captured image is smaller than the reference line number, the first photoelectric converters L that are the specific photoelectric converters corresponding to the face area. On the other hand, this embodiment selects, when the face line number is larger than the reference line number, the first photoelectric converters L that are the specific photoelectric converters corresponding to the eye area.

Thereby, a problem can be prevented that a larger face size in the captured image than the reference line number makes it unable to read out the output signals of the first photoelectric converters L that should be all read out simultaneously and thereby makes it impossible to acquire required phase difference information. Furthermore, it is possible to acquire the required phase difference information from the first photoelectric converters L selected depending on the eye area.

The CPU 8 may change the reference line number Lc depending on a recording frame rate in the image capturing apparatus. For example, setting a larger reference line number Lc when the recording frame rate is low than that when the recording frame rate is high enables the first photoelectric converters L corresponding to the eye area to be preferentially selected.

Embodiment 2

Next, description will be made of a second embodiment (Embodiment 2) of the present invention. This embodiment reads out, when the face line number Lf is larger than the reference line number Lc, multiple first photoelectric converters L selected so as to correspond to the face area in a time-division manner to produce phase difference information.

A configuration of an image capturing apparatus of this embodiment is the same as that of Embodiment 1 (FIG. 1), and constituent components common to those in Embodiment 1 are denoted by the same reference numeral as those in Embodiment 1.

Figure 6:
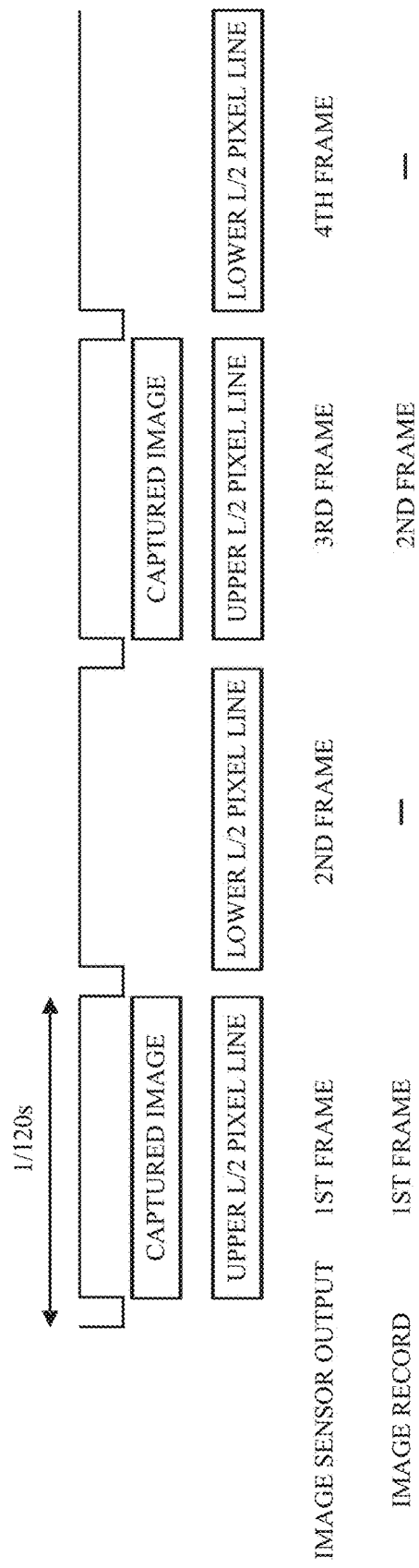
FIG. 6 illustrates frame division readout from the phase difference information acquisition area in an image capturing apparatus that is Embodiment 2.

This embodiment describes a case where an image capturing/readout frame rate of the image sensor 2 is 120 fps (120 frames per second), and a recording frame rate of the image capturing apparatus is 60 fps (60 frames per second). In other words, although the image sensor 2 is capable of reading out L+R signals of 120 frames, the image capturing apparatus records 60 frames per second. Therefore, when the face line number Lf in the captured image is larger than the reference line number Lc, the following signal readout from the image sensor 2 is performed. As illustrated in FIG. 6, at a first frame (first image capturing operation), L+R signals are read out from all pixels in the image sensor 2. Simultaneously, L signals from pixels in an upper half part (upper L/2 pixel lines) of a face phase difference acquisition area selected so as to correspond to a face area, that is, from first photoelectric converters as one specific photoelectric converter group are read out. Next, at a second frame (second image capturing operation), the L+R signals are not read out, but L signals from pixels in a lower half part (lower L/2 pixel lines) of the face phase difference acquisition area, that is, from first photoelectric converters as another one specific photoelectric converter group are read out. At subsequent frames (third or more image capturing operations), the above-described operations are alternately repeated. This series of image capturing operations enables satisfactorily producing, even when the face area is large, that is, the face line number Lf is larger than the reference line number Lc, the phase difference information from the face area in each period of two frames.

The division number of the face phase difference acquisition pixel area (multiple specific photoelectric converters) may be set depending on a difference of the face line number Lf from the reference line number Lc. When Lf/2>Lc, the division number may be three or more.

Figure 7:
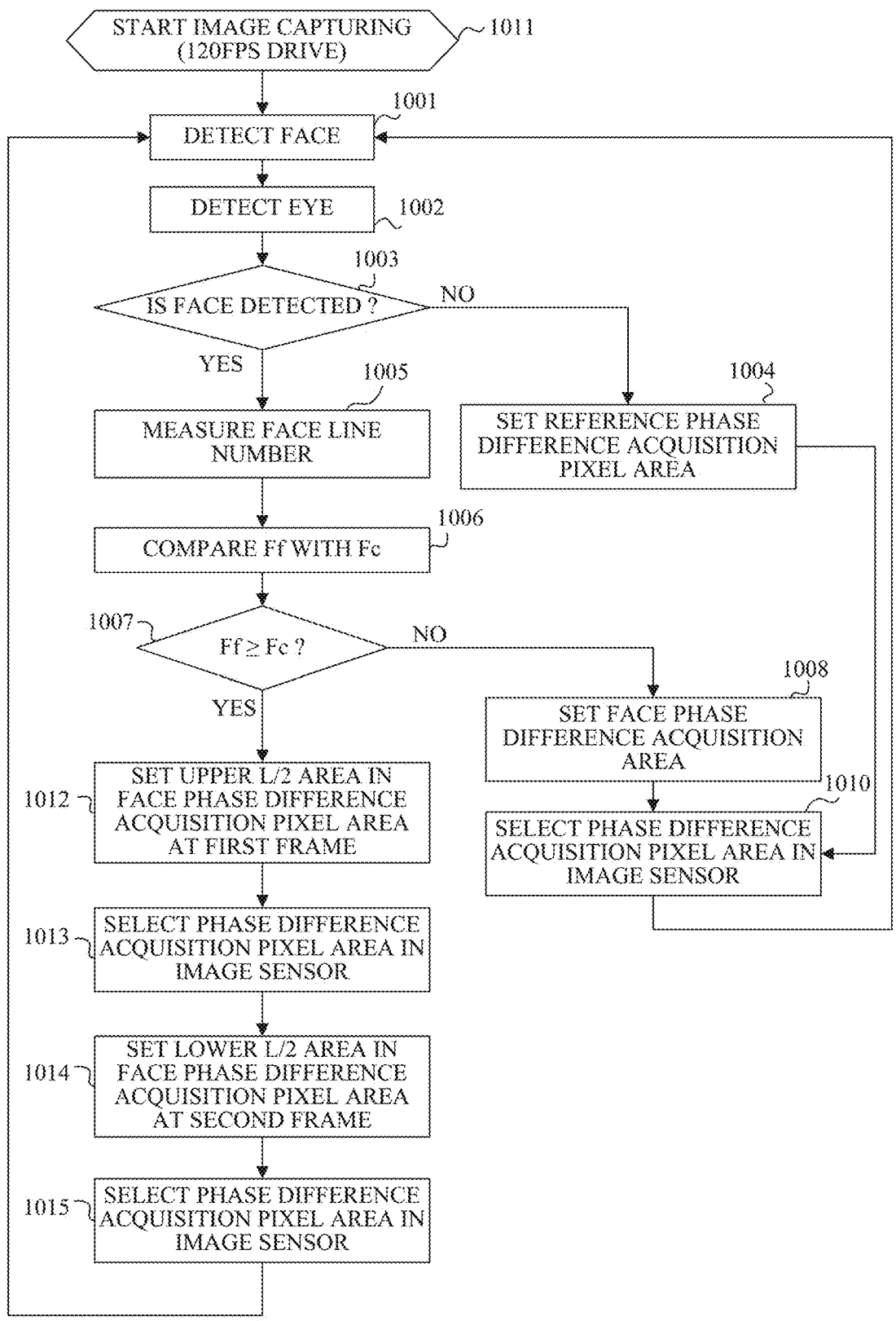
FIG. 7 a flowchart illustrating a process performed in the image capturing apparatus of Embodiment 2.

Next, description will be made of image processing performed by a CPU 8 in this embodiment with referring to FIG. 7. The CPU 8 as a computer executes this image processing according to an image processing program as a computer program.

At step 1011, the CPU 8 causes the image sensor 2 to start a photoelectric conversion operation (image capturing operation). The CPU 8 sets the image capturing/readout frame rate is 120 fps.

Figure 5:
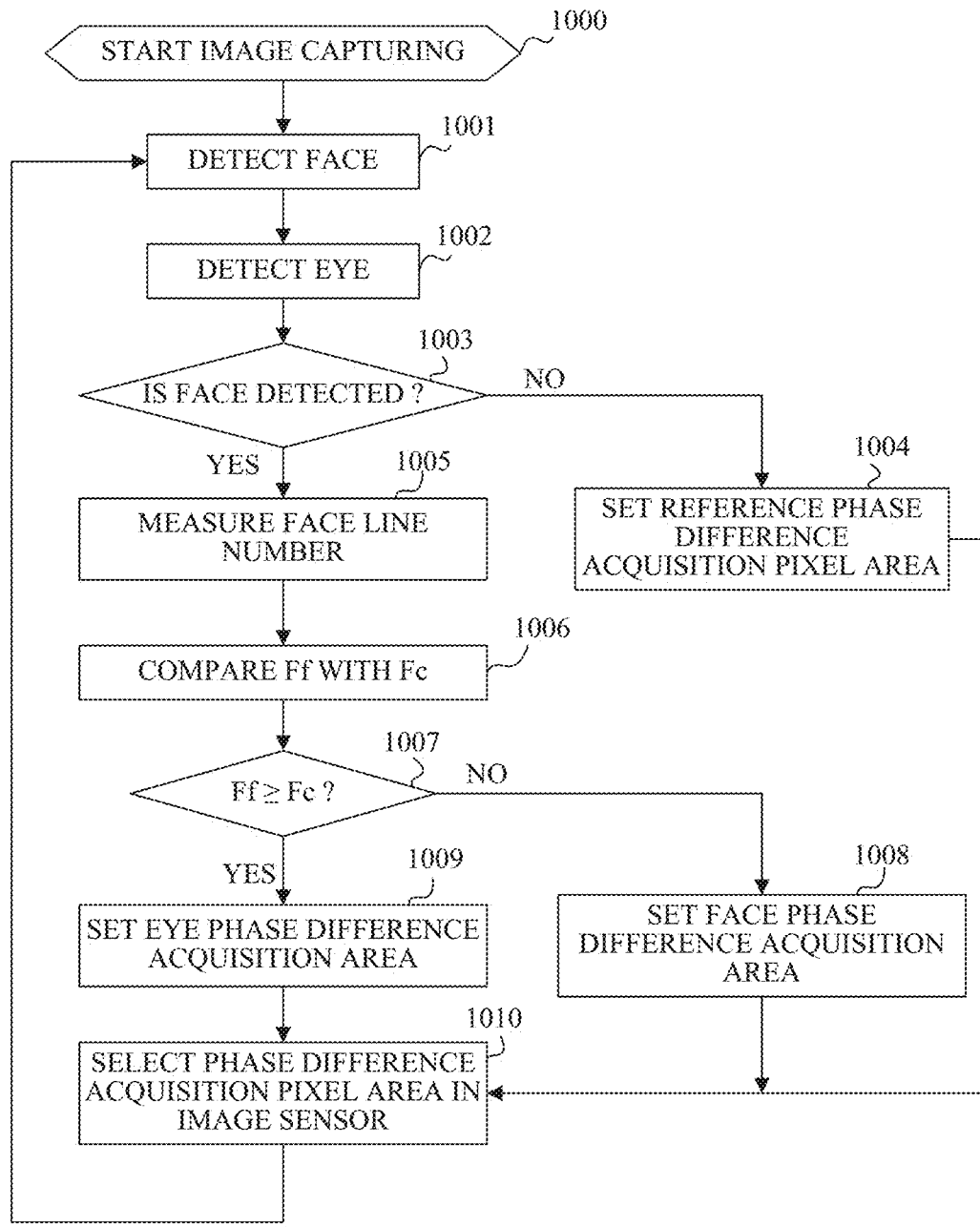
FIG. 5 is a flowchart illustrating a process performed in the image capturing apparatus of Embodiment 1.

Processes at steps 1001 to 1007 are the same as those at steps 1001 to 1007 in Embodiment 1 (FIG. 5).

Furthermore, when determining at step 1007 that the face line number Lf is smaller than the reference line number Lc, as in Embodiment 1, the CPU 8 sets at step 1008 the face phase difference acquisition pixel area corresponding to the face area. Then, at step 1010, the CPU 8 selects in the image sensor 2 the face phase difference acquisition pixel area set at step 1008.

On the other hand, when determining at step 1007 that the face line number Lf is larger than (or equal to) the reference line number Lc, the CPU 8 proceeds to step 1012. At step 1012, the CPU 8 sets, for the first frame, an upper half part (upper L/2 area including the upper L/2 pixel lines) of two vertically-divided parts in the face phase difference acquisition area. Then, at step 1013, the CPU 8 selects in the image sensor 2 the upper L/2 area set at step 1012.

Next at step 1014, the CPU 8 sets, for the second frame, a lower half part (lower L/2 area including the lower L/2 pixel lines) of the two vertically-divided parts in the face phase difference acquisition area. Then, at step 1015, the CPU 8 selects in the image sensor 2 the lower L/2 area set at step 1014. The processes performed at steps 1012 to 1014 correspond to a selection process. Thereafter, the CPU 8 returns to step 1001.

As described above, this embodiment selects, when the face line number that is an image size of a face included in a captured image is smaller than the reference line number, the first photoelectric converters L that are the specific photoelectric converters corresponding to the face area. On the other hand, this embodiment divides, when the face line number is larger than the reference line number, the first photoelectric converters L that are the specific photoelectric converters into multiple groups (specific photoelectric converter groups) and selects mutually different one of the multiple specific photoelectric converter groups at each of the multiple image capturing operations. Thereby, a problem can be prevented that a larger face size in the captured image than the reference line number makes it unable to read out the output signals of the first photoelectric converters L that should be all read out simultaneously and thereby makes it impossible to acquire required phase difference information.

Each of the above embodiments described the case where the phase difference information calculator 4 calculates the phase difference information by using the first output of the first photoelectric converter and the difference output obtained by subtracting the first output from the additive output of the first and second photoelectric converters. However, the phase difference information calculator 4 may calculate the phase difference information by using the first output of the first photoelectric converter and the second output of the second photoelectric converter.

Each of the above embodiments is capable of satisfactorily providing, even when the object is large in the captured image, the required phase difference information from the image sensor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-241056, filed on Dec. 10, 2015, which is hereby incorporated by reference herein in its entirety.

What is claimed is:

1. An image processing apparatus used in an image capturing apparatus provided with an image sensor including multiple photoelectric converters, the image processing apparatus comprising:
an image producer configured to produce a captured image by using outputs from the multiple photoelectric converters;
a phase difference information acquirer configured to acquire phase difference information by using outputs from multiple specific photoelectric converters that are a part of the multiple photoelectric converters;
an object detector configured to detect an object included in the captured image;
a size detector configured to detect an image size of the detected object; and
a selector configured to select the specific photoelectric converters,
wherein the object detector is capable of detecting, as the object, a first object and a second object that is a part of the first object,
the selector is configured (a) to select, when the image size of the first object is smaller than a predetermined size, the specific photoelectric converters depending on a first area including the first object in the captured image and (b) to select, when the image size of the first object is larger than the predetermined size, the specific photoelectric converters depending on a second area including the second object in the captured image.

2. An image processing apparatus according to claim 1, wherein the image size and the predetermined size are each a number of pixel lines.

3. An image processing apparatus according to claim 1, wherein the selector is configured to change the predetermined size depending on a recording frame rate of the image capturing apparatus.

4. An image processing apparatus according to claim 1, wherein:
the image sensor includes multiple pixels, each pixel including a first photoelectric converter and a second photoelectric converter each being the photoelectric converter;
the image producer is configured to produce the captured image by using an additive output obtained by adding a first output from the first photoelectric converter and a second output from the first photoelectric converter to each other; and
the phase difference information acquirer is configured to acquire the phase difference information by using the first and second outputs or by using the first output and a difference output obtained by subtracting the first output from the additive output.

5. An capturing apparatus comprising:
an image sensor including multiple photoelectric converters; and
an image processing apparatus,
wherein the image processing apparatus comprises:
an image producer configured to produce a captured image by using outputs from the multiple photoelectric converters;
a phase difference information acquirer configured to acquire phase difference information by using outputs from multiple specific photoelectric converters that are a part of the multiple photoelectric converters;
an object detector configured to detect an object included in the captured image;
a size detector configured to detect an image size of the detected object; and
a selector configured to select the specific photoelectric converters,
wherein the object detector is capable of detecting, as the object, a first object and a second object that is a part of the first object,
the selector is configured (a) to select, when the image size of the first object is smaller than a predetermined size, the specific photoelectric converters depending on a first area including the first object in the captured image and (b) to select, when the image size of the first object is larger than the predetermined size, the specific photoelectric converters depending on a second area including the second object in the captured image.

6. A non-transitory computer-readable storage medium for storing a computer program to cause a computer in an image capturing apparatus provided with an image sensor including multiple photoelectric converters to execute image processing,
wherein the image processing includes:
a process of producing a captured image by using outputs from the multiple photoelectric converters;
a process of acquiring phase difference information by using outputs from multiple specific photoelectric converters that are a part of the multiple photoelectric converters;
an object detection process of detecting an object included in the captured image;
a size detection process of detecting an image size of the detected object; and
a selection process of selecting the specific photoelectric converters,
wherein:
the object detection process is capable of detecting, as the object, a first object and a second object that is a part of the first object;
the selection process (a) selects, when the image size of the first object is smaller than a predetermined size, the specific photoelectric converters depending on a first area including the first object in the captured image and (b) selects, when the image size of the first object is larger than the predetermined size, the specific photoelectric converters depending on a second area including the second object in the captured image.

7. An image processing apparatus used in an image capturing apparatus provided with an image sensor including multiple photoelectric converters, the image processing apparatus comprising:
an image producer configured to produce a captured image by using outputs from the multiple photoelectric converters;
a phase difference information acquirer configured to acquire phase difference information by using outputs from multiple specific photoelectric converters that are a part of the multiple photoelectric converters;
an object detector configured to detect an object included in the captured image;
a size detector configured to detect an image size of the detected object; and
a selector configured to select the specific photoelectric converters,
wherein the selector is configured (a) to select, when the image size of the object is smaller than a predetermined size, the specific photoelectric converters depending on an area including the object in the captured image and (b) to divide, when the image size of the object is larger than the predetermined size, the multiple specific photoelectric converters into multiple specific photoelectric converter groups and select a mutually different one of the specific photoelectric converter groups in each of multiple image capturing operations.

8. An image processing apparatus according to claim 7, wherein the image size and the predetermined size are each a number of pixel lines.

9. An image processing apparatus according to claim 7, wherein the selector is configured to change the predetermined size depending on a recording frame rate of the image capturing apparatus.

10. An image processing apparatus according to claim 7, wherein:
the image sensor includes multiple pixels, each pixel including a first photoelectric converter and a second photoelectric converter each being the photoelectric converter;
the image producer is configured to produce the captured image by using an additive output obtained by adding a first output from the first photoelectric converter and a second output from the first photoelectric converter to each other; and
the phase difference information acquirer is configured to acquire the phase difference information by using the first and second outputs or by using the first output and a difference output obtained by subtracting the first output from the additive output.

11. An capturing apparatus comprising:
an image sensor including multiple photoelectric converters; and
an image processing apparatus,
wherein the image processing apparatus comprises:
an image producer configured to produce a captured image by using outputs from the multiple photoelectric converters;
a phase difference information acquirer configured to acquire phase difference information by using outputs from multiple specific photoelectric converters that are a part of the multiple photoelectric converters;
an object detector configured to detect an object included in the captured image;
a size detector configured to detect an image size of the detected object; and
a selector configured to select the specific photoelectric converters,
wherein the selector is configured (a) to select, when the image size of the object is smaller than a predetermined size, the specific photoelectric converters depending on an area including the object in the captured image and (b) to divide, when the image size of the object is larger than the predetermined size, the multiple specific photoelectric converters into multiple specific photoelectric converter groups and to select a mutually different one of the specific photoelectric converter groups in each of multiple image capturing operations.

12. A non-transitory computer-readable storage medium for storing a computer program to cause a computer in an image capturing apparatus provided with an image sensor including multiple photoelectric converters to execute image processing,
wherein the image processing includes:
a process of producing a captured image by using outputs from the multiple photoelectric converters;
a process of acquiring phase difference information by using outputs from multiple specific photoelectric converters that are a part of the multiple photoelectric converters;
an object detection process of detecting an object included in the captured image;
a size detection process of detecting an image size of the detected object; and
a selection process of selecting the specific photoelectric converters,
wherein the selection process (a) selects, when the image size of the object is smaller than a predetermined size, the specific photoelectric converters depending on an area including the object in the captured image and (b) divides, when the image size of the object is larger than the predetermined size, the multiple specific photoelectric converters into multiple specific photoelectric converter groups and selects a mutually different one of the specific photoelectric converter groups in each of multiple image capturing operations.

* * * * *